(12) United States Patent
Hadley

(10) Patent No.: US 10,701,868 B2
(45) Date of Patent: Jul. 7, 2020

(54) MULTI-DOOR APPARATUS FOR GROWING PLANTS

(71) Applicant: Donald Anthony Hadley, Coatesville, PA (US)

(72) Inventor: Donald Anthony Hadley, Coatesville, PA (US)

(*) Notice: Subject to any disclaimer, the term of this patent is extended or adjusted under 35 U.S.C. 154(b) by 314 days.

(21) Appl. No.: 15/609,168

(22) Filed: May 31, 2017

(65) Prior Publication Data
US 2017/0354097 A1    Dec. 14, 2017

Related U.S. Application Data

(60) Provisional application No. 62/349,695, filed on Jun. 14, 2017.

(51) Int. Cl.
*A01G 9/02* (2018.01)
*A01G 9/04* (2006.01)
*A01G 9/00* (2018.01)

(52) U.S. Cl.
CPC ........... *A01G 9/02* (2013.01); *A01G 9/042* (2013.01); *A01G 2009/003* (2013.01)

(58) Field of Classification Search
CPC ..... A01G 9/02; A01G 9/042; A01G 2009/003
See application file for complete search history.

(56) References Cited

U.S. PATENT DOCUMENTS

| | | | | |
|---|---|---|---|---|
| 129,972 A * | 7/1872 | Ludlum | ............... | A01G 9/0295 47/73 |
| 610,156 A * | 8/1898 | Mechwart | ............ | A01G 9/0295 47/73 |
| 637,763 A * | 11/1899 | Burke | ................. | A01G 9/0293 47/73 |
| 716,688 A | 12/1902 | Cheney | | |
| 726,766 A * | 4/1903 | Schaefer | .............. | A01G 9/0295 47/73 |
| 2,594,307 A * | 4/1952 | Valenzuela | ............ | A01G 9/029 47/73 |
| 4,145,841 A * | 3/1979 | Woolpert | ................. | A01G 9/02 47/66.1 |
| 4,216,622 A * | 8/1980 | Hollenbach | ............ | A01G 9/029 47/71 |
| 4,700,507 A * | 10/1987 | Allen | ................. | A01G 13/0243 47/32.4 |
| 5,117,582 A | 6/1992 | Cissel | | |
| 5,157,869 A * | 10/1992 | Minton | .................... | A01G 9/02 220/4.21 |
| 5,930,951 A * | 8/1999 | Wong | ....................... | A01G 9/02 47/66.1 |
| 6,223,466 B1 * | 5/2001 | Billings | .................. | A01G 9/02 47/75 |

(Continued)

*Primary Examiner* — Marc Burgess
(74) *Attorney, Agent, or Firm* — Larson & Larson, P.A.; Frank Liebenow; Justin P. Miller

(57) ABSTRACT

An apparatus for growing plants is includes a body section having an upper orifice, a lower orifice, a back section, and at least one door. The upper orifice allows for planting of a plant while the at least one door allows for removal of the plant for transplanting. The upper orifice is smaller in cross-sectional area than the lower orifice allowing for plants to grow in their natural pattern giving the roots more room to grow in more soil from which to absorb nutrients making for a happier, healthier plant which will not need to be transplanted as often.

14 Claims, 6 Drawing Sheets

(56) References Cited

U.S. PATENT DOCUMENTS

| | | | |
|---|---|---|---|
| 6,694,671 B2* | 2/2004 | Vahrmeyer | A01G 9/02 47/65.5 |
| 2003/0029079 A1* | 2/2003 | Kleinert | A01G 13/10 47/32.4 |
| 2003/0213175 A1* | 11/2003 | Rhindress | A01G 9/029 47/73 |
| 2007/0157513 A1 | 6/2007 | Varney | |
| 2014/0144077 A1 | 5/2014 | Harmer | |
| 2014/0246348 A1* | 9/2014 | Seddon | A01G 9/02 206/423 |
| 2016/0270305 A1* | 9/2016 | Shaffer | A01G 13/105 |

* cited by examiner

MULTI-DOOR APPARATUS FOR GROWING PLANTS

CROSS-REFERENCE TO RELATED APPLICATION

This application claims the benefit of U.S. provisional application No. 62/349,695 filed on Jun. 14, 2016, the disclosure of which is incorporated by reference.

FIELD

This invention relates to the field of horticulture and more particularly to a potting system for growing plants.

BACKGROUND

Virtually all planter pots, flowers vegetable, trees etc., are a generally of conical shape with the widest portion of the cone at the top where the plant emerges from the soil. This is a very convenient shape for manufacturing, marketing and storage. However, this shape causes the roots of the plant, which grow in a general inverted conical pattern, to grow in an unnatural pattern which leads to the plant getting root bound rather quickly. The roots touch less soil in this condition and therefore can't absorb the minerals. This cramps the growth of the plant. Also, at the open portion of the conical shape has a large surface area, the water evaporates quickly through this wide open top, leading to plants drying out quickly and needing frequent watering. In addition to the root growth problem and the water evaporation problem, conical shape pots with the widest portion of the cone at the top are top-heavy and unstable, getting knocked over easily, especially outside in the wind.

What is needed is system and apparatus for growing plants that will overcome such shortcomings.

SUMMARY

In one embodiment, an apparatus for growing plants is disclosed including a body section having an upper orifice, a lower orifice, a back section, and at least one door. The upper orifice allows for planting of a plant while the at least one door allows for removal of the plant for transplanting. The upper orifice is smaller in cross-sectional area than the lower orifice.

In another embodiment, an apparatus for growing plants is disclosed including a body section having a conical shape with an upper orifice, a lower orifice, a back section, and at least one door. The upper orifice is round and allows for planting of a plant. The lower orifice is also round. The at least one door allows for removal of the plant for transplanting. A first diameter of the upper orifice is smaller than a second diameter of the lower orifice.

In another embodiment, an apparatus for growing plants is disclosed including a body section having a pyramid shape with an upper orifice, a lower orifice, a back section, and at least one door. The upper orifice is a regular polygon and allows for planting of a plant. The lower orifice is another regular polygon. The at least one door allows for removal of the plant for transplanting. A first cross-sectional area of the upper orifice is smaller than a second cross-sectional area of the lower orifice.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
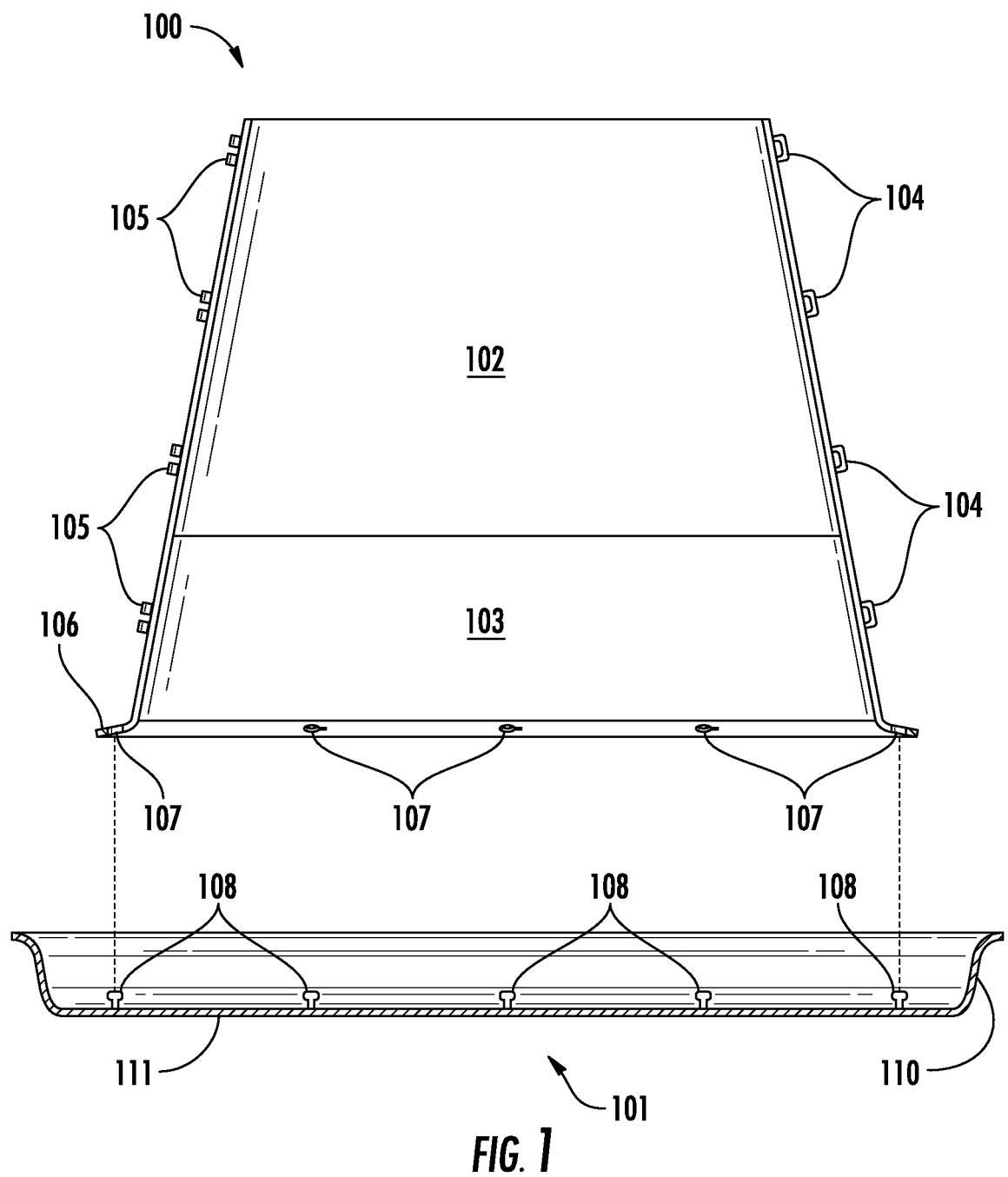
FIG. 1 illustrates a side plan view of a conical design shown lifted off of the base.

Reference will now be made in detail to the presently preferred embodiments of the invention, examples of which are illustrated in the accompanying drawings. Throughout the following detailed description, the same reference numerals refer to the same elements in all figures.

The system and apparatus for growing plants is described having an open conical shape with the wider section of the cone at the bottom and a four-sided pyramid shape with the wider section of the pyramid at the bottom. The overall outer shape is anticipated to be any functional or stylized shape as long as the bottom of the system and apparatus for growing plants is of larger cross-sectional area than the top opening, through which the plant emerges. An example of this is a pyramid having sixteen sides.

The disclosed apparatus allow the planter to be stored in an efficient manner.

It is anticipated that the disclosed apparatus be made of a stiff material such as plastic, metal, ceramic, clay or any material known in the art.

Referring to FIG. 1, a side plan view of a conical shaped planter having a conical body section 100 is shown lifted off of the base 101. The conical body section 100 and the base 101 to which it secures are shown separated. The conical body section 100 has an opening or orifice at the top through which one or more plants emerge. A circumference of the orifice at the top is smaller than a circumference of an orifice at the bottom.

The conical body section 100 shown has an upper door panel 102 and a lower door panel 103. A first side of each of the door panels 102/103 is secured to the back portion 112 (see FIG. 2) by at least one hinge 105, allowing the door panels 102/103 to open yet remain secured to the conical body section 100. On a distal side of each door panel is at least one latch 104 for securing the respective door panel 102/103 in a closed position and allowing for opening of the door panels 102/103. There is a flange 106 (e.g., brim) around the circumference of the bottom of the conical body section 100 (lower orifice). The flange 106 has one or more slotted holes 107 for securing the conical body section 100 to the base 101. The conical body section 100 is secured to the base 101 by inserting the posts 108 of the base 101 into the slotted holes 107, then turning the conical body section 100 slightly on the base 101 until the posts 108 slide into the slots of the slotted holes 107.

Figure 2:
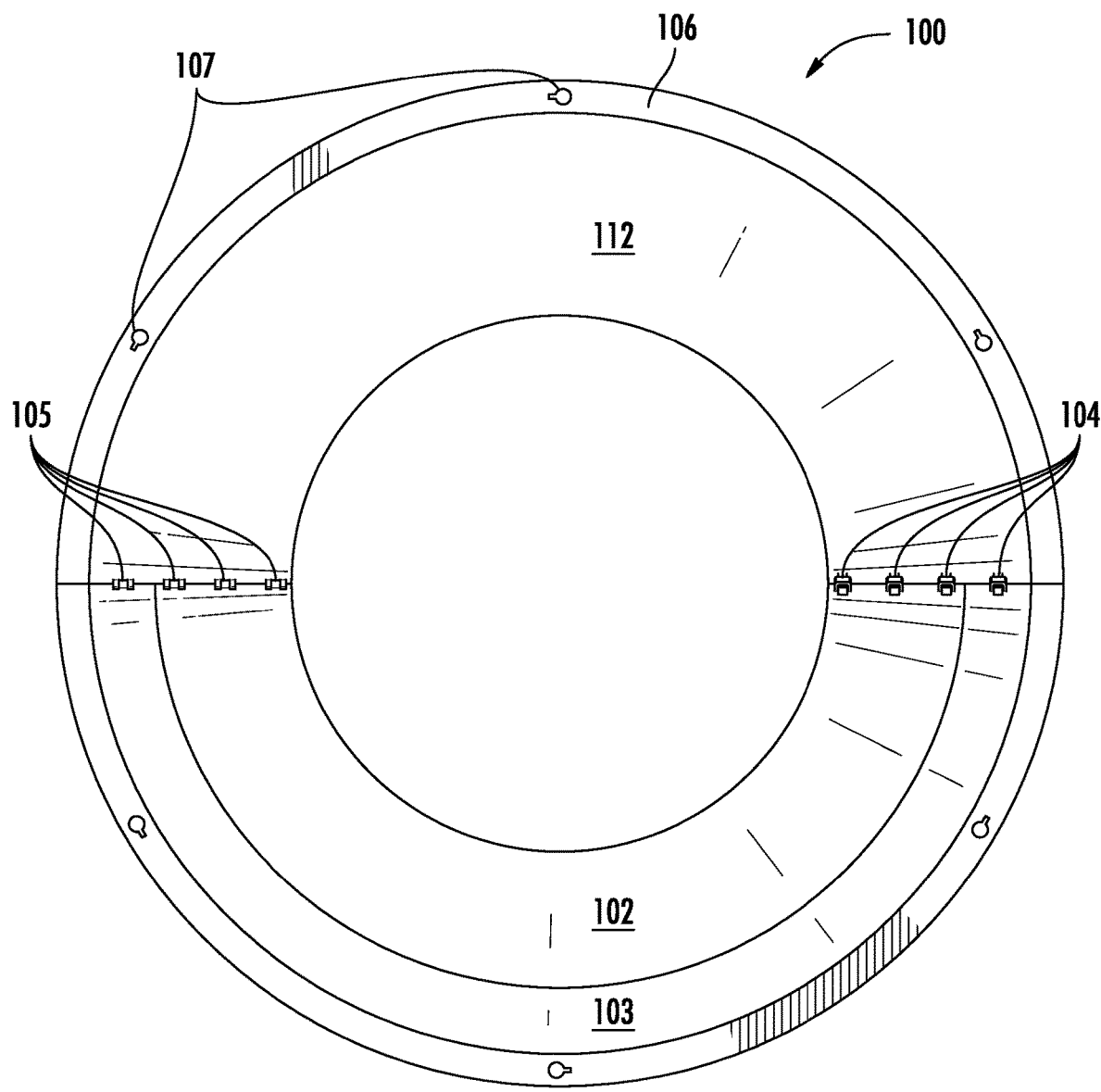
FIG. 2 illustrates a top plan view of the conical design with the doors in the closed position.

Referring to FIG. 2, a top plan view of the planter having a conical body section 100 is shown with the door panels 102/103 in the closed position. The conical body section 100 is shown with the upper door panel 102 and the lower door panel 103 both in the closed and secured position. The door panels 102/103, are secured to the back portion 112 by hinges 105 on one side, allowing the door panels 102/103 to swing open yet stay secured to the back portion 112 by way of the latches 104 when shut. At the bottom of the conical body section 100 is a flange 106 running around a circumference of the conical body section 100. In some embodiments, the flange 106 is used to secure the conical body section 100 to the base 101 via the slotted holes 107 in the flange 106.

Figure 3:
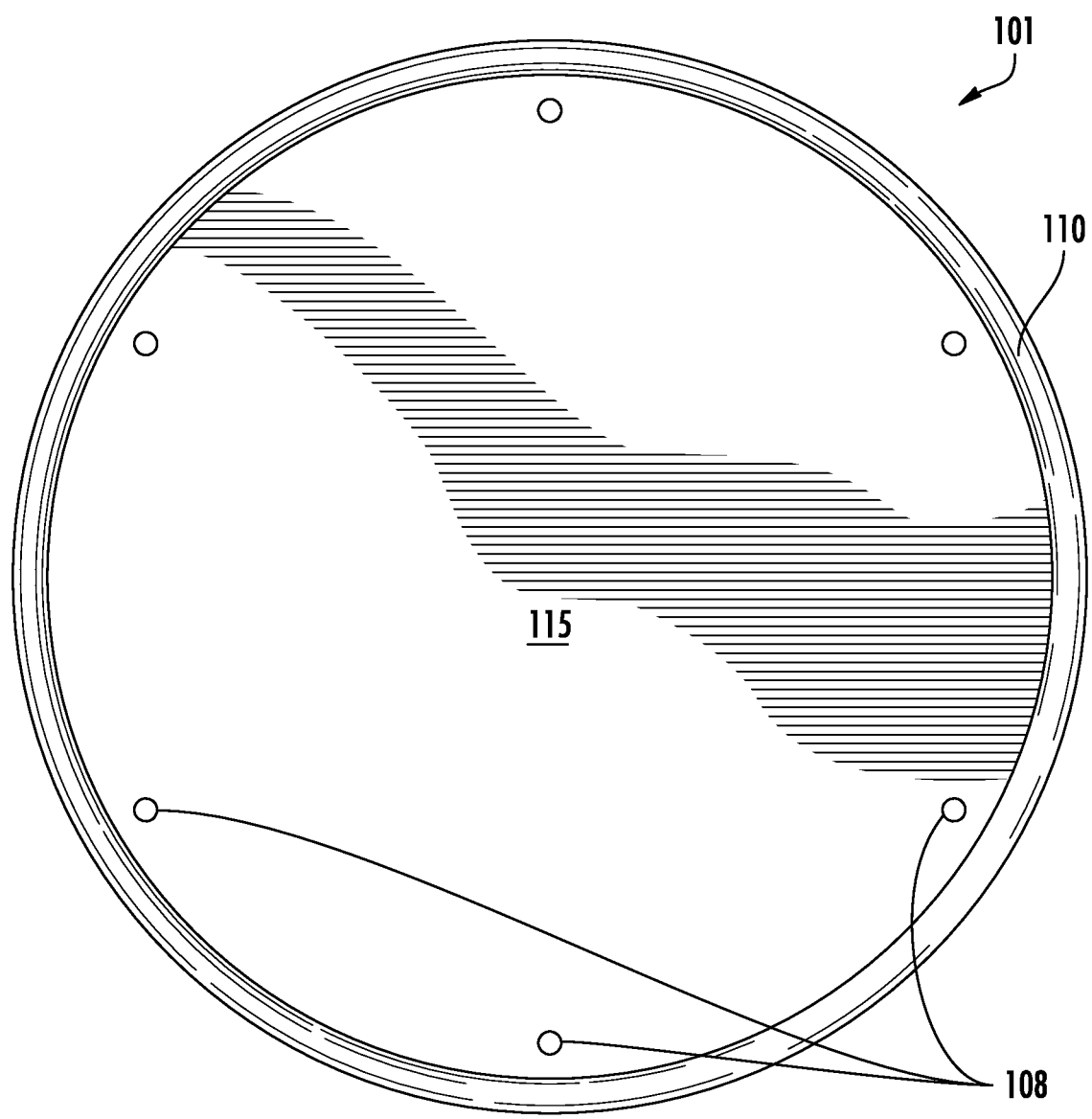
FIG. 3 illustrates a top view of the base for the conical design.

Referring to FIG. 3, a top view of the base 101 for the conical shaped planter is shown. The base 101 for the conical shaped planter has posts 108 onto which the conical body section 100 is secured. The sides 110 of the base 101 are raised for containment of water. It is anticipated that the sides be of any shape, for example, straight, protruding outward (as in drawing) or inward.

Figure 4:
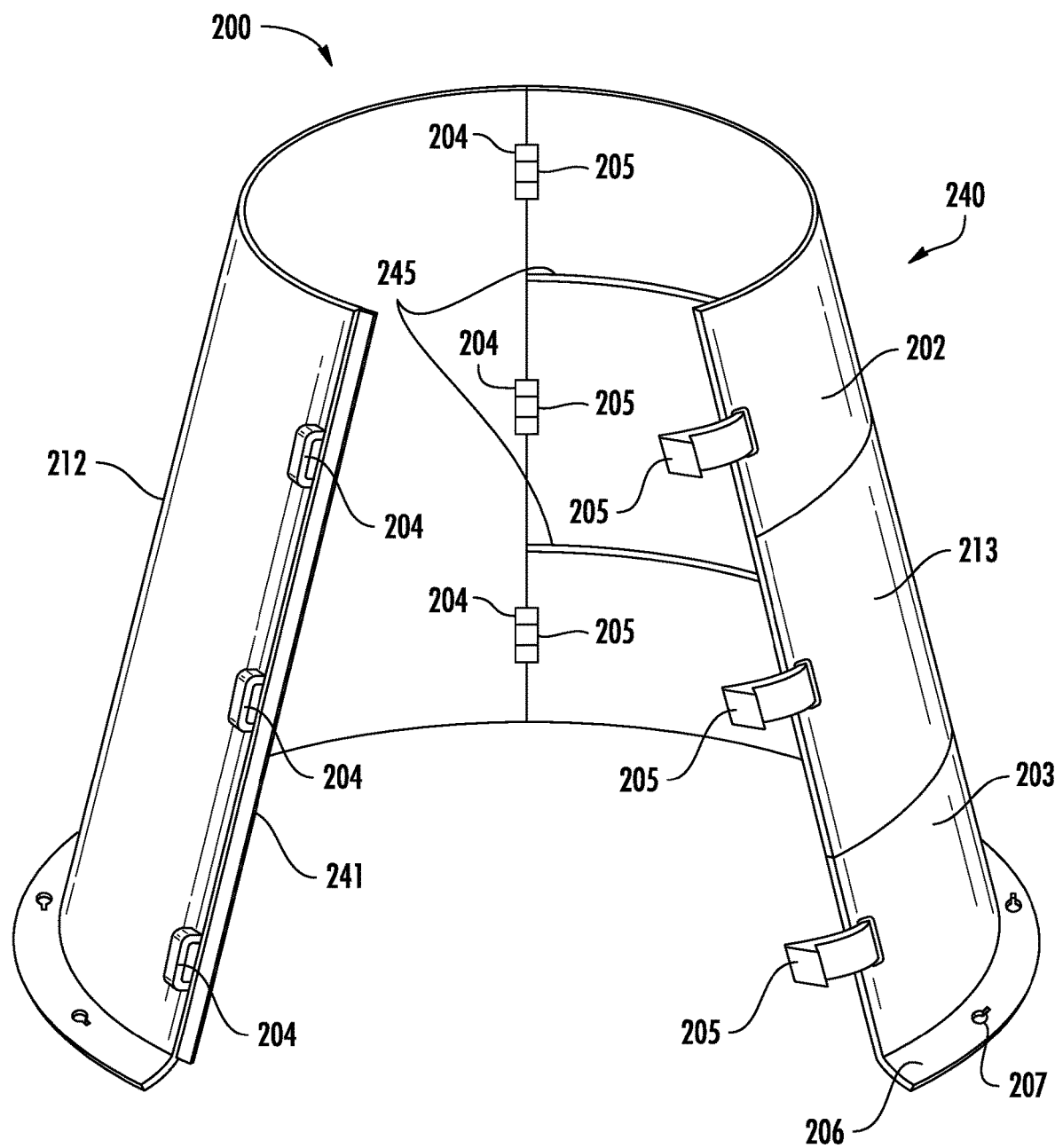
FIG. 4 illustrates a perspective view is of the conical design with a door section opened.

Referring to FIG. 4, a perspective view of a conical body 200 is shown. The body has one door sections 240 and one back section 212. The door section 240 is shown opened. In this example, the door section 240 has three doors panels 202/203/213 that include an upper door panel 202, a lower door panel 203 and a middle door panel 213. As before, the flange 206 has slotted holes 207 for securing to the base 101 (same as in FIGS. 1 and 2). In this embodiment, the upper door panel 202 and the middle door panel 213 have lips 245 for sealing purposes. When the door panels 202/203/213 are closed and secured with the hinges/latches 204/205, the lip 245 of the upper door panel 202 rest over an upper edge of the middle door panel 213 and the lip 245 of the middle door panel 213 rest over an upper edge of the lower door panel 203, reducing leakage and evaporation of liquids from within the second conical body 200. As the door panels 202/203/213 are closed, the lip 245 of each door panel 202/203/213 goes over an edge of the subsequent door panels 202/203/213 below (e.g. the lip 245 of the upper door panel 202 closes over an upper edge of the middle door panel 213.

In this embodiment, the back section 212 and/or each door section 240 has a lengthwise lip 241 for reducing leakage and evaporation of liquids from within the second conical body 200. The lengthwise lip 241 also benefits in improved structural stability.

The hinges/latches 204/205 secure the door panels 202/203/213 to the back section 212 while allowing the door panels 202/203/213 to swing open and shut for removal of a plant and soil held within.

Figure 5:
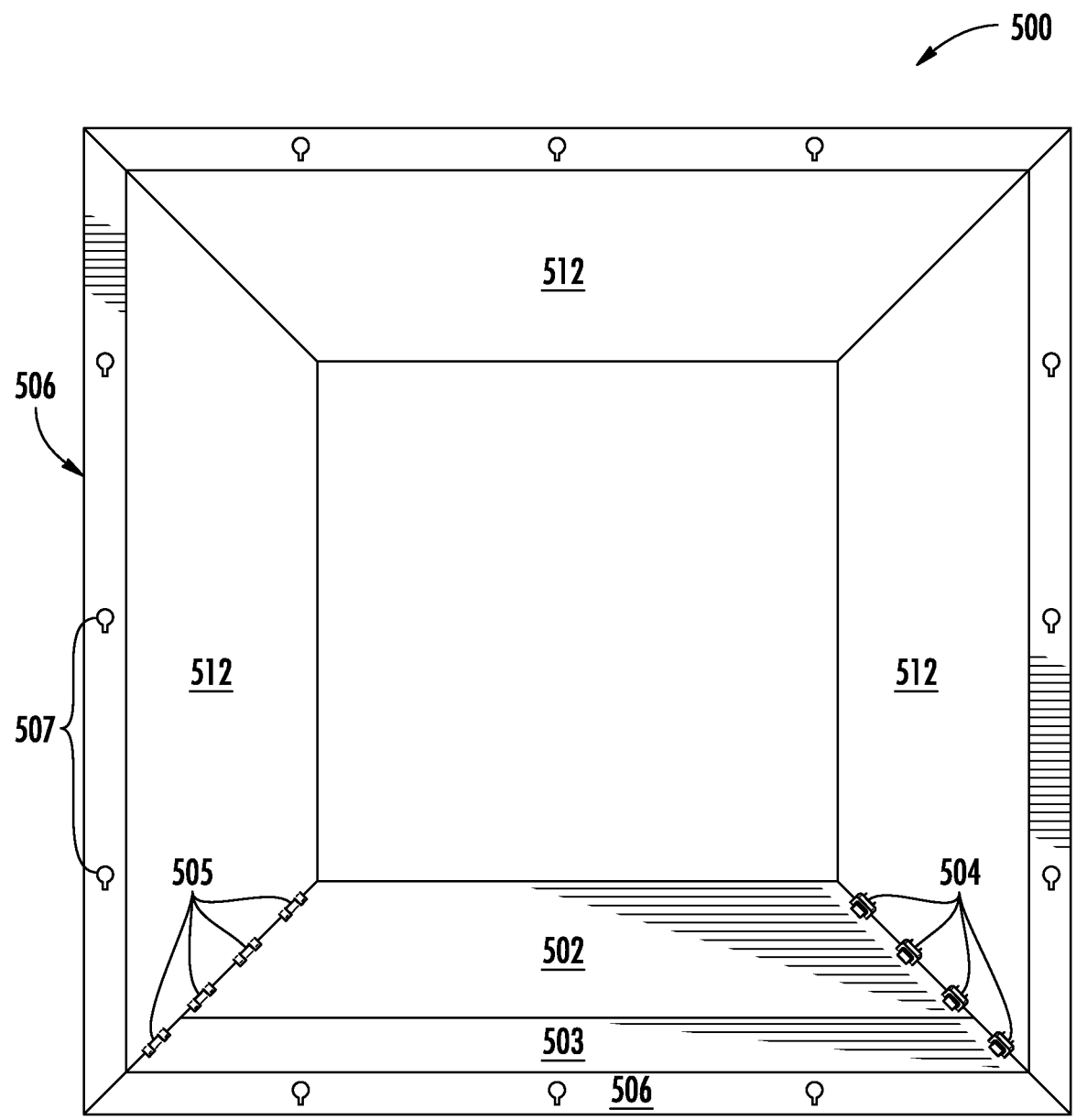
FIG. 5 illustrates a bottom perspective view of a square design having a single door section with two door panels.

Referring to FIG. 5, a bottom perspective view of a pyramid-shaped planter is shown. The pyramid-shaped planter has a pyramid-shaped body section 500 that has, in this example, a single door section having an upper door panel 502 (parallelogram) and a lower door panel 503 (parallelogram). The pyramid-shaped planter has an opening or orifice at the top, preferably shaped as a regular parallelogram, through which one or more plants emerge. A cross-sectional area of the orifice at the top is smaller than a cross-sectional area of the bottom (orifice) which is also a regular parallelogram.

The upper door panel 502 and a lower door panel 503 are shown in the closed position. The back panel 512 has three sides, though any number of sides is anticipated from three to more than three sides. The door panels 502/503 interface to the back panel 512 with hinges/latches 504/505 to removably secure the door panels 502/503 to the back panel 512, allowing the door panels 502/503 to open and close securely. In some embodiments, flange 506 is formed at the bottom (widest part) of the pyramid-shaped body having slotted holes 507. In this embodiment, all of the slotted holes 507 are aligned in the same direction for securing the body to the base 600 (see FIG. 6). Such securing is done by slightly sliding the pyramid-shaped body section 500 after insertion of the posts 608 into the slotted holes 507 (instead of twisting as in the conical shaped planter).

Figure 6:
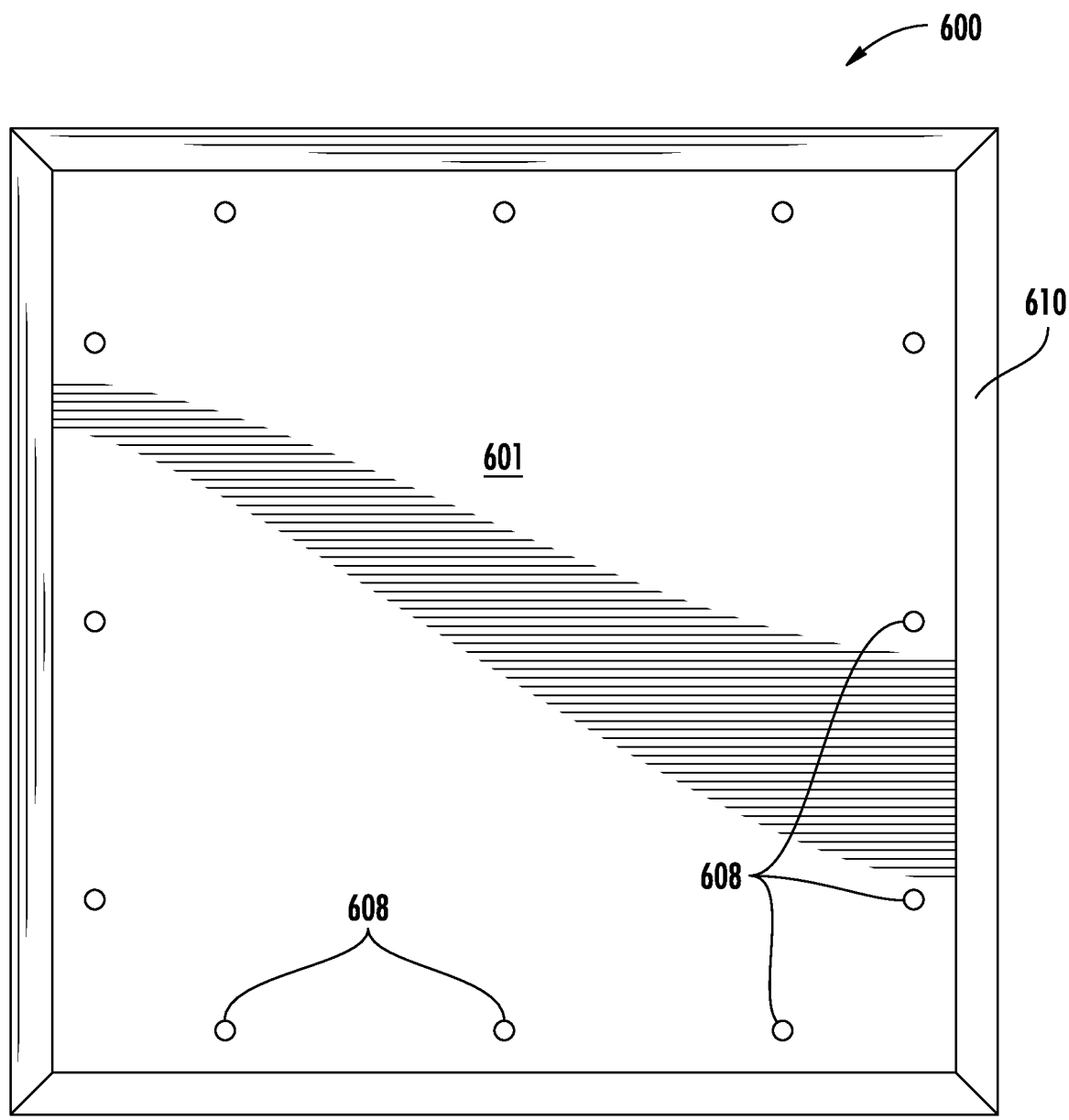
FIG. 6 illustrates a top plan view of a base for the square design.

Referring to FIG. 6, a top plan view of a base 600 for the pyramid-shaped planter is shown. The floor 601 of the base 600 has posts 608 extending therefrom for securing to the pyramid-shaped body section 500. In a preferred embodiment, raised sides 610 for containing water extend from edges of the floor 601.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. An apparatus for growing plants, the apparatus comprising:
    a body section comprising:
        an open upper end;
        an open lower end;
        a continuous back section of unitary construction; and
        a front section that consists of at least two vertically stacked doors, a first edge of each of the doors connected at one end to a first edge of the back section by a hinge, and an opposing distal edge of each of the doors removably held to an opposing second edge of the back section by a latch, and each door comprises an overlapping lip configured such that adjacent doors overlap vertically and horizontally,
    wherein the open upper end allows for planting of a plant, the at least two doors allow for removal of the plant for transplanting; and
    wherein the open upper end is smaller in cross-sectional area than the open lower end.

2. The apparatus for growing plants of claim 1, wherein the upper orifice is round and the lower orifice is round.

3. The apparatus for growing plants of claim 1, wherein at least one of the door sections comprises a second lip on the opposing distal edge of each of the doors.

4. The apparatus for growing plants of claim 1, further comprising a flange formed around an outer edge of the open lower end.

5. The apparatus for growing plants of claim 4, wherein the flange comprises a plurality of slotted holes.

6. The apparatus for growing plants of claim 5, further comprising a base, the base comprising post aligning with the slotted holes for removably securing the body to the base.

7. An apparatus for growing plants, the apparatus comprising:
    a body section having a conical shape comprising:
        an open upper end;
        an open lower end;
        a continuous back section of unitary construction; and
        a front section that consists of at least two vertically stacked doors, a first edge of each of the doors connected at one end to a first edge of the back section by a hinge, and an opposing distal edge of each of the doors removably held to an opposing second edge of the back section by a latch, and each door comprises an overlapping lip configured such that adjacent doors overlap vertically and horizontally, wherein the open upper end is round and allows for planting of a plant, the open lower end is round, the at least two doors allow for removal of the plant for transplanting; and wherein a first diameter of the open upper end is smaller than a second diameter of the open lower end.

8. The apparatus for growing plants of claim 7, further comprising a flange is formed around a circumference of the open lower end.

9. The apparatus for growing plants of claim 8, wherein the flange comprises a plurality of slotted holes.

10. The apparatus for growing plants of claim 9, further comprising a base, the base comprising posts that align with the slotted holes for removably securing the body to the base.

11. An apparatus for growing plants, the apparatus comprising:
a body section having a pyramid shape comprising:
an open upper end;
an open lower end;
a continuous back section of unitary construction; and
a front section that consists of at least two vertically stacked doors, a first edge of each of the doors connected at one end to a first edge of the back section by a hinge, and an opposing distal edge of each of the doors removably held to an opposing second edge of the back section by a latch, and each door comprises an overlapping lip configured such that adjacent doors overlap vertically and horizontally, wherein the open upper end is a regular polygon and allows for planting of a plant, the open lower end is another regular polygon, the at least two doors allow for removal of the plant for transplanting; and wherein a first cross-sectional area of the open upper end is smaller than a second cross-sectional area of the open lower end.

12. The apparatus for growing plants of claim 11, further comprising a flange formed around an outer edge of the lower orifice.

13. The apparatus for growing plants of claim 12, wherein the flange comprises a plurality of slotted holes.

14. The apparatus for growing plants of claim 13, further comprising a base, the base comprising posts that align with the slotted holes for removably securing the body to the base.

* * * * *